(12) United States Patent
Choi et al.

(10) Patent No.: US 8,778,536 B2
(45) Date of Patent: Jul. 15, 2014

(54) LITHIUM MANGANESE OXIDE POSITIVE ACTIVE MATERIAL FOR LITHIUM ION SECONDARY BATTERY AND LITHIUM ION SECONDARY BATTERY INCLUDING THE SAME

(75) Inventors: Shin Jung Choi, Asan-si (KR); Sung Nim Jo, Asan-si (KR)

(73) Assignee: Samsung Fine Chemicals Co., Ltd., Ulsan (KR)

( * ) Notice: Subject to any disclaimer, the term of this patent is extended or adjusted under 35 U.S.C. 154(b) by 0 days.

(21) Appl. No.: 13/603,752

(22) Filed: Sep. 5, 2012

(65) Prior Publication Data

US 2013/0260244 A1 Oct. 3, 2013

(30) Foreign Application Priority Data

Apr. 3, 2012 (KR) ........................ 10-2012-0034611

(51) Int. Cl.
*H01M 4/505* (2010.01)
(52) U.S. Cl.
USPC .......................................... 429/219; 429/224
(58) Field of Classification Search
None
See application file for complete search history.

(56) References Cited

U.S. PATENT DOCUMENTS

| 2002/0081494 A1* | 6/2002 | Kondo et al. ................. 429/224 |
| 2011/0070500 A1* | 3/2011 | Chen et al. ................ 429/231.95 |
| 2012/0156560 A1* | 6/2012 | Hong et al. ................... 429/211 |

FOREIGN PATENT DOCUMENTS

JP 2-82450 3/1990

OTHER PUBLICATIONS

Hyun-Wook Lee et al., "Ultrathin Spinel $LiMn_2O_4$ Nanowires as High Power Cathode Materials for Li-Ion Batteries", Nano Letters, vol. 10, No. 10, 2010, pp. 3852-3856.
Jia-Yan Luo et al., "$LiMn_2O_4$ Nanorods, Nanothorn Microspheres, and Hollow Nanospheres as Enhanced Cathode Materials of Lithium Ion Battery", Journal of Physical Chemistry C, vol. 112, No. 31, 2008, pp. 12051-12057.
Xiaoling Xiao et al., "$LiMn_2O_4$ Microspheres: Synthesis, Characterization and Use As a Cathode in Lithium Ion Batteries", Nano Research, vol. 3, No. 10, 2010, pp. 733-737.
D.I. Siapkas et al., "Synthesis and characterization of $LiMn_2O_4$ for use in Li-ion batteries", Journal of Power Sources, vol. 72, No. 1, 1998, pp. 22-26.
Extended European Search Report issued Nov. 21, 2012 in corresponding European Patent Application No. 12179374.9.

* cited by examiner

*Primary Examiner* — Patrick Ryan
*Assistant Examiner* — Haixia Zhang
(74) *Attorney, Agent, or Firm* — Osha Liang LLP (57) ABSTRACT

Provided are a lithium manganese oxide positive active material for a lithium ion secondary battery and a lithium ion secondary battery including the same. The lithium manganese oxide positive active material includes a spinel lithium manganese oxide of three or more types of particles having different sizes mixed therein, wherein first type particles have an average diameter of 5 μm or greater, second type particles have an average diameter of 1 μm or less, third type particles have an average diameter of 200 nm or less, and the average diameter of the second type particles is greater than that of the third type particles.

10 Claims, 5 Drawing Sheets

FIG. 7

LITHIUM MANGANESE OXIDE POSITIVE ACTIVE MATERIAL FOR LITHIUM ION SECONDARY BATTERY AND LITHIUM ION SECONDARY BATTERY INCLUDING THE SAME

CROSS-REFERENCE TO RELATED APPLICATION

This application claims priority to and the benefit of Korean Patent Application No. 10-2012-0034611, filed on Apr. 3, 2012, the entire content of which is incorporated herein by reference.

BACKGROUND OF THE INVENTION

1. Field of the Invention

Aspects of the present invention relate to a lithium manganese oxide positive active material for a lithium ion secondary battery and a lithium ion secondary battery including the same. More particularly, aspects of the present invention relate to a lithium manganese oxide positive active material including a spinel lithium manganese oxide of three or more types of particles having different sizes, and a lithium ion secondary battery including the same.

2. Description of the Related Art

As applications of lithium ion secondary batteries are gradually extending from power sources for small-sized electric/electronic devices to power sources and power storage for large-sized electric/electronic devices such as electric vehicles, there is an increasing demand for a positive active material for a secondary battery having improved properties including high safety, long cycle life, high energy density and high power capability.

The lithium ion secondary batteries generally manufactured by providing a positive electrode and a negative electrode capable of reversibly intercalating/deintercalating lithium ions, and inserting an electrolyte into a space between the positive electrode and the negative electrode. The batteries produce and store electrical energy as a result of a redox reaction caused upon intercalating/deintercalating the lithium ions at the positive electrode and the negative electrode.

Various kinds of carbonaceous materials may be used as negative active materials of a lithium ion secondary battery, and lithium metal oxides may be used as positive active materials.

Specifically, spinel lithium manganese oxides are environmentally friendly and highly safe because they do not include heavy metals, such as cobalt. However, using the spinel lithium manganese oxide as the positive active material is considered problematic because of their low energy density per weight and volume of a layered lithium metal oxide.

BRIEF SUMMARY OF THE INVENTION

Aspects of the present invention provide a lithium manganese oxide positive active material, which can improve an energy density per volume and power capability of a lithium ion secondary battery.

Aspects of the present invention also provide a lithium ion secondary battery including the lithium manganese oxide positive active material.

In accordance with one aspect of the present invention, there is provided a lithium manganese oxide positive active material for a lithium ion secondary battery, the positive active material including a spinel lithium manganese oxide of three or more types of particles having different sizes mixed therein, wherein first type particles have an average diameter of 5 μm or greater, second type particles have an average diameter of 1 μm or less, third type particles have an average diameter of 200 nm or less, and the average diameter of the second type particles is greater than that of the third type particles.

A ratio of the number of first type particles to the number of second type particles and a ratio of the number of second type particles to the number of third type particles may be in a range between 1 and 4.

The first type particles may be shaped of spheres.

The third type particles may be shaped of rods.

The lithium manganese oxide positive active material may further include fourth type particles having an average diameter of 40 nm or less, wherein the average diameter of the third type particles is greater than that of the fourth type particles.

The fourth type particles may be shaped of nanowires.

The spinel lithium manganese oxide may include $LiMn_2O_4$, at least one $LiM_xMn_{2-x}O_4$, where M is at least one selected from the group consisting of Ni, Zr, Co, Mg, Mo, Al and Ag, and $0<x<1$, and at least one $LiM_xMn_{2-x}O_{4-z}F_z$, where M is at least one selected from the group consisting of Ni, Zr, Co, Mg, Mo, Al and Ag, $0<x<1$, and $0<z<1$.

In accordance with another aspect of the present invention, there is provided a lithium ion secondary battery comprising a positive electrode including the positive active material, a negative electrode and an electrolyte.

As described above, according to the present invention, since a positive active material having lithium manganese oxide particles having different sizes mixed therein is used, the energy density per volume can be considerably improved and power capability is also improved, thereby preventing capacity characteristics from deteriorating during high-speed charge/discharge cycles and ultimately greatly improving the capacity characteristics of lithium manganese oxide secondary batteries for use in automotive vehicles or as power storage.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, embodiments of the present invention will be described in detail with reference to the accompanying drawings.

The present invention provides a lithium manganese oxide positive active material for a lithium ion secondary battery, the positive active material including a spinel lithium manganese oxide of three or more types of particles having different sizes mixed therein, wherein first type particles have an average diameter of 5 µm or greater, second type particles have an average diameter of 1 µm or less, third type particles have an average diameter of 200 nm or less, and the average diameter of the second type particles is greater than that of the third type particles.

As the positive active material for a lithium ion secondary battery, lithium metal oxide is generally used and can be classified into a layered type, a spinel type and an olivine type according to configuration. The layered positive active material, represented by $LiMO_2$ (where M is a metal such as Co, Ni or Mn), is configured such that lithium ions exist between two $MO_2$ layers in a crystal structure. The layered positive active material may have different electrochemical properties according to the kind or proportion of transition metal existing in the crystalline structure. The spinel lithium metal oxide is represented by $LiM_2O_4$ (where M is a metal such as Mn or Ni) and has a hexahedral crystalline structure. The three-dimensional crystalline structure of the spinel lithium metal oxide allows rapid diffusion of lithium ions to demonstrate good power capability. The spinel oxide may be represented by $LiMn_2O_4$. The olivine-type lithium metal oxide may be represented by $LiFePO_4$, and is structurally stable, resulting in a small decrease in the capacity even by repeated cycles.

The spinel lithium manganese oxide according to the present invention may basically include $LiMn_2O_4$, and may include a metal precursor of Ni, Zr, Co, Mg, Mo, Al or Ag, except for Mn, in the form of $LiM_xMn_{2-x}O_4$, where M is at least one selected from the group consisting of Ni, Zr, Co, Mg, Mo, Al and Ag, and $0<x<1$, and a fluorine-substituted lithium metal composite oxide in the form of $LiM_xMn_{2-x}O_{4-z}F_z$, where M is at least one selected from the group consisting of Ni, Zr, Co, Mg, Mo, Al and Ag, $0<x<1$, and $0<z<1$.

The present invention is directed to a lithium manganese oxide positive active material including a spinel lithium manganese oxide of three or more types of particles having different sizes mixed therein, wherein first type particles have an average diameter of 5 µm or greater, second type particles have an average diameter of 1 µm or less, third type particles have an average diameter of 200 nm or less, and the average diameter of the second type particles may be greater than that of the third type particles.

In addition, the positive active material according to the present invention may further include fourth type particles in addition to the first to third type particles, the fourth type particles have an average diameter of 40 nm or less, and the average diameter of the third type particles may be greater than that of the fourth type particles.

In other words, when the positive active material according to the present invention includes a spinel lithium manganese oxide of three or more types of particles having different sizes mixed therein, the largest particles may have an average diameter of 5 µm or greater, the middle-sized particles may have an average diameter of 1 µm or less, and the smallest particles may have an average diameter of 200 nm or less. In addition, the positive active material according to the present invention may additionally include spinel lithium manganese oxide particles having a different size. Here, the additionally included particles may have an average diameter of 40 nm or less.

If the first, second and third type particle sizes of the lithium manganese oxide are in the ranges stated above, pores of an electrode comprised of the first type particles may be filed with the second type particles and pores of an electrode comprised of the second type particles may be filed with the third type particles.

In the lithium manganese oxide positive active material according to the present invention, a ratio of the number of first type particles to the number of second type particles and a ratio of the number of second type particles to the number of third type particles are preferably in a range between 1 and 4.

Figure 1:
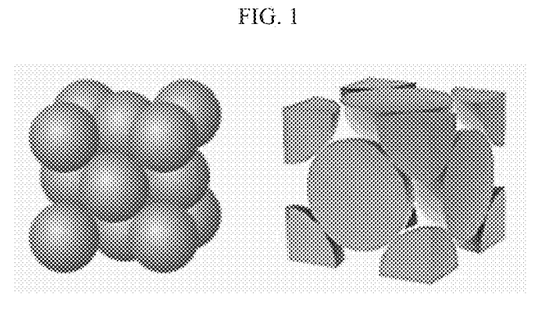
FIG. 1 illustrates a structure of spinel lithium manganese oxide particles assuming that the particles are spherical.
Figure 2A:
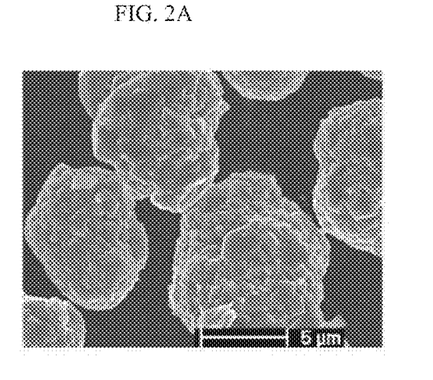
FIGS. 2A to 2D are SEM photographs of $LiMn_2O_4$ particles synthesized in Preparation Examples 1 to 4.
Figure 2B:
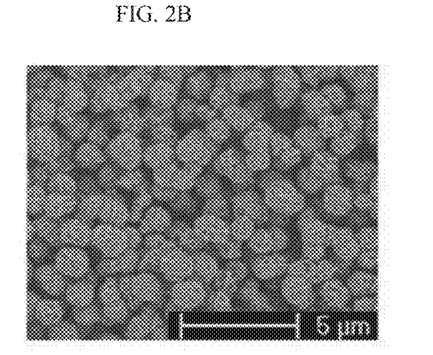
Figure 2C:
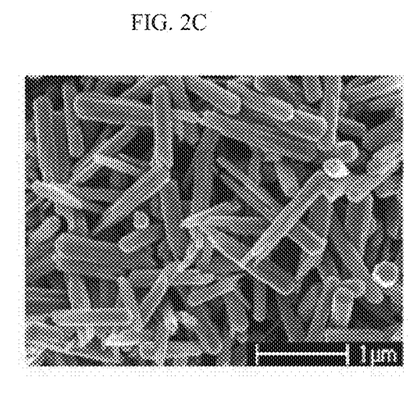
Figure 2D:
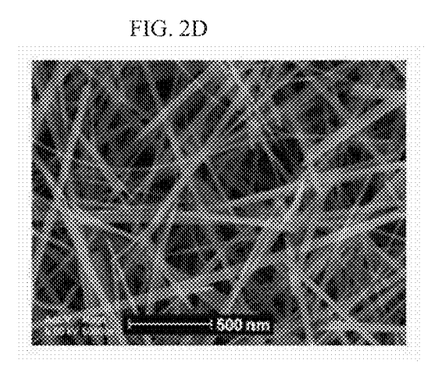
Figure 3:
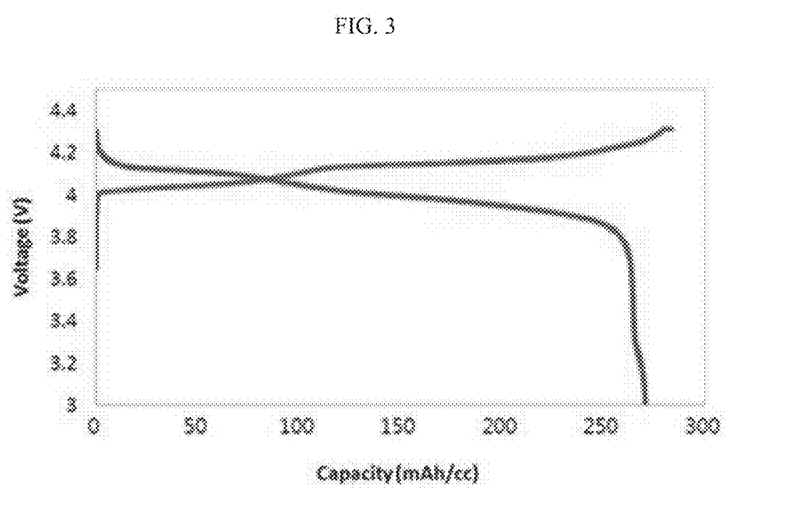
FIG. 3 is a graph illustrating battery capacity measurement result of a coin cell obtained in Example 1.
Figure 4:
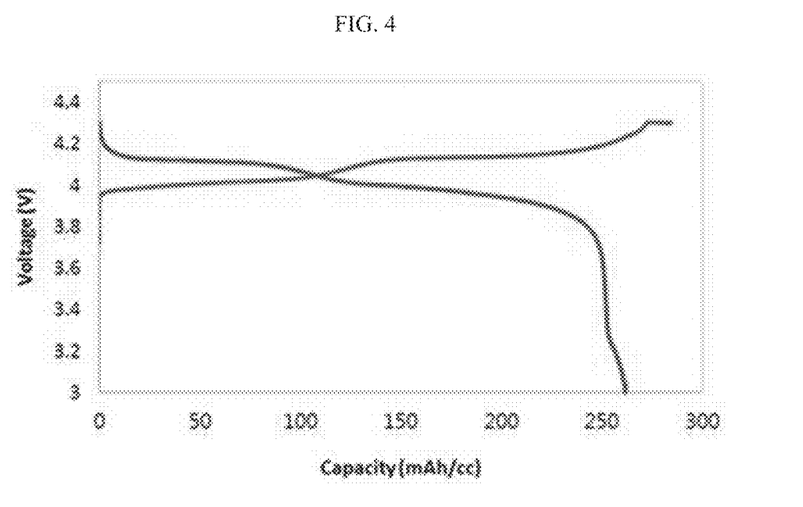
FIG. 4 is a graph illustrating battery capacity measurement result of a coin cell obtained in Comparative Example 1.
Figure 5:
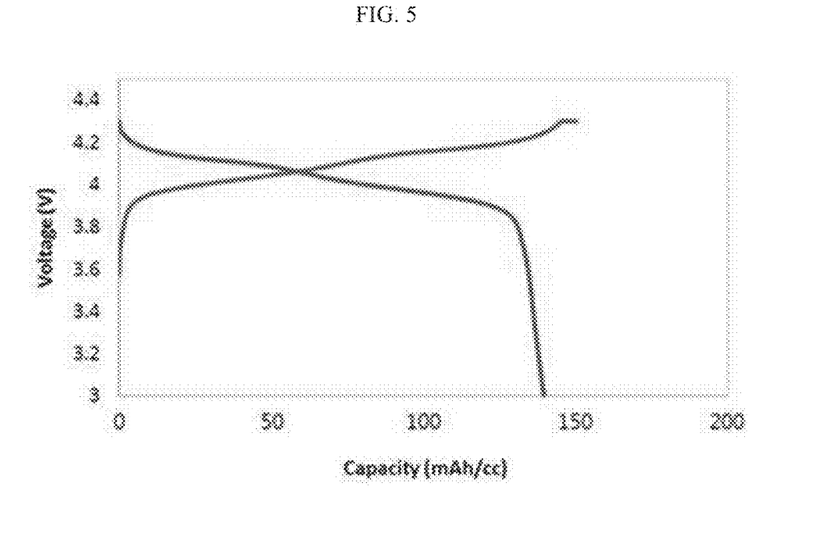
FIG. 5 is a graph illustrating battery capacity measurement result of a coin cell obtained in Comparative Example 2.
Figure 6:
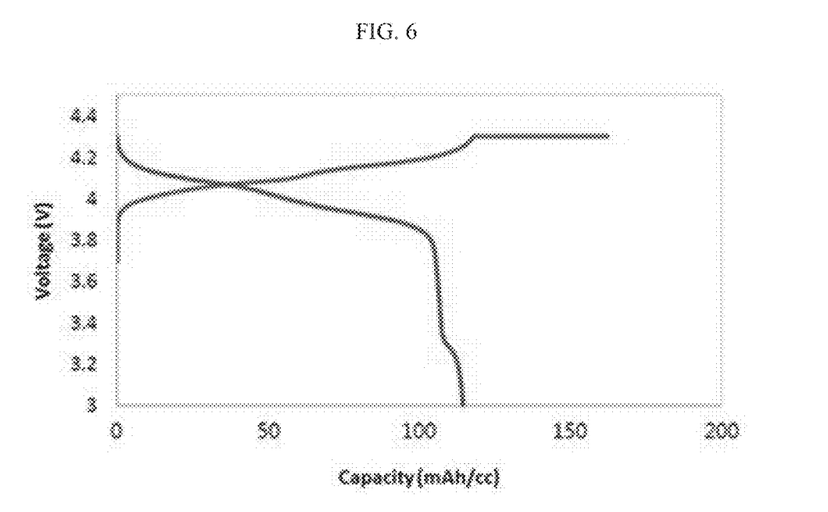
FIG. 6 is a graph illustrating battery capacity measurement result of a coin cell obtained in Comparative Example 3.
Figure 7:
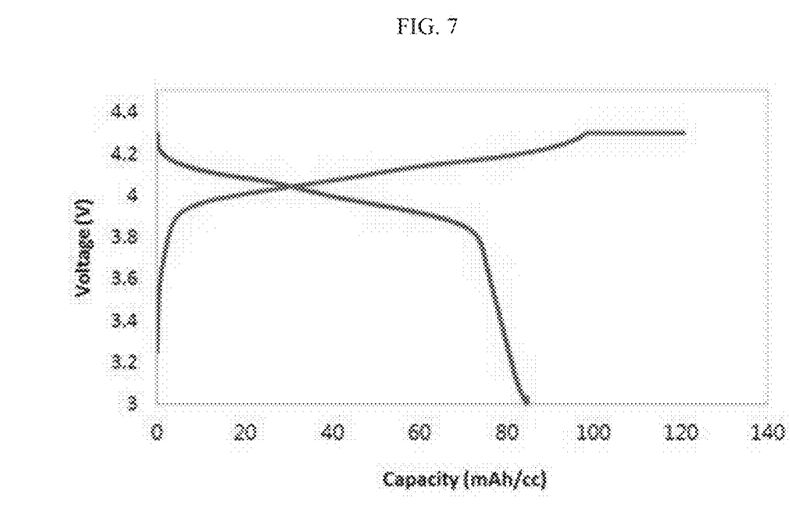
FIG. 7 is a graph illustrating battery capacity measurement result of a coin cell obtained in Comparative Example 4.

The number ratio of different sized particles means a value into which consideration of sizes of particles small enough to exist in empty spaces between large particles in a packing structure assuming that particles are spherical (see FIG. 1). If the number ratio of the lithium manganese oxide particles included in the positive active material is greater than or equal to 1, the energy density per volume and output characteristics of battery can be improved. However, if the number ratio exceeds 4, the effects of the improved energy density per volume and output characteristics of battery are negligible. If the number ratio is less than 1, the energy density per volume is lowered.

The spinel lithium manganese oxide particles according to the present invention may have various shapes. Since the first type particles among the spinel lithium manganese oxide particles included in the positive active material according to the present invention are largest, they are preferably shaped of spheres to minimize the overall volume. As shown in FIG. 1, when large sized particles are spherical, empty spaces are created among the large sized particles.

The second, third and fourth type particles may be shaped of spheres, rods or nanowires according to the sizes.

When particles are shaped of spheres, the average particle diameter indicates an average diameter of particles, and when particles are shaped of rods or nanowires, the average particle diameter indicates an average width of particles (see FIGS. 2A to 2D).

In the present invention, the lithium manganese oxide positive active material is prepared as follows.

First, the spinel lithium manganese oxide particles included in the lithium manganese oxide positive active material according to the present invention may be prepared by mixing a lithium compound and a manganese oxide and performing heat treatment on the resultant mixture.

The lithium compound may be a generally used lithium compound for use in a positive active material of a lithium ion secondary battery, and examples thereof may include at least one selected from the group consisting of lithium hydroxide, lithium carbonate, lithium nitrate, and lithium acetate. The manganese oxide may be at least one selected from the group consisting of manganese dioxide, manganese trioxide, and manganese carbonate.

The heat treatment may be calcination performed at a temperature ranging from 600 to 1000° C. for 10 to 30 hours. After the performing of the heat treatment, grinding or pulverizing may further be performed to control particle sizes of the lithium manganese oxide while removing impurities.

The shapes and sizes of the prepared lithium manganese oxide particles are considerably affected by the shape and size of manganese oxide particles as a precursor. Therefore, in order to prepare lithium manganese oxide particles having different sizes, manganese oxides having desired particle sizes and shapes should be independently used. In some cases, the shapes and sizes of the manganese oxide particles may be controlled by performing pre-treatment.

The sizes of the manganese oxide particles may be controlled by adjusting the concentration, temperature and pH level in a precursor preparation process in which a manganese salt is dissolved in a basic solution such as ammonia or sodium hydroxide and then heated at a temperature of 30° C. to 80° C. for 2 to 20 hours. Alternatively, the sizes of the manganese oxide particles may be controlled by adjusting the pH level or using a pulverizing process to remove microparticles or macroparticles.

Alternatively, the shapes and sizes of the manganese oxide particles may be controlled by milling. The milling may be performed using a milling machine such as a ball mill, an attrition mill, a vibration mill, a disk mill, a jet mill, a rotor mill, and so on. The milling may be performed by a dry process, a wet process or a combination thereof.

In addition, lithium manganese oxide particles having the average particle diameter of 1 μm or less may be prepared by hydrothermal synthesis. For example, the pH level is adjusted by adding sulfuric acid or potassium hydroxide to an aqueous solution of manganese salt and an oxidizing agent and then heated at 100° C. or higher for 10 hours or more to obtain a manganese oxide, followed by uniformly mixing the same with a lithium compound and performing heat treatment, thereby obtaining particles having the average particle diameter of 1 μm or less, for example, 200 nm or 40 nm.

In the present invention, the lithium manganese oxide particles may be prepared by a liquid phase method such as co-precipitation or a sol-gel method. For example, spherical manganese hydroxide particles may be prepared by mixing $MnSO_4$, an ammonia solution, and NaOH solution in a reaction vessel and sizes of the spherical manganese hydroxide particles may be controlled according to the reaction condition.

The present invention also provides a lithium ion secondary battery including a positive electrode comprising the lithium manganese oxide positive active material, a negative electrode and an electrolyte.

An electrode used in the lithium ion secondary battery is generally prepared by coating a slurry prepared by mixing and dispersing an active material, a binder and a conductive agent in a solvent, drying and pressing.

In the lithium ion secondary battery according to the present invention, the negative active material may include natural graphite, artificial graphite, carbon fiber, cokes, carbon black, carbon nanotube, fulleren, activated carbon, lithium metal or a lithium alloy, but not limited thereto.

A current collector of the lithium ion secondary battery may collect electrons by an electrochemical reaction of the active material or may supply electrons required in the electrochemical reaction. Aluminum or an aluminum alloy may be used as a positive electrode current collector, and stainless steel, nickel, copper, titanium, or alloys thereof may be used as a negative electrode current collector.

The binding force of the electrode active material may be reinforced by forming small irregularities on a surface of the current collector and may be formed in various types, including a film, a sheet, a foil, a net, a porous body, a foamed body, a non-woven fabric body, and so on.

The binder may bind the active material and the conductive agent and fix the same to the current collector. Any binder that is generally used in the art to which the present invention pertains can be used without limitation, and examples thereof may be at least one selected from the group consisting of polyvinylidenefluoride, polypropylene, carboxyl methyl cellulose (CMC), starch, hydroxypropylcellulose, polyvinylpyrrolidone, tetrafluoroethylene, polyethylene, ethylene-propylene-diene polymer, polyvinyl alcohol, styrene butadiene rubber (SBR) and fluorine rubber.

The conductive agent is not particularly limited, and may be any material so long as it has a suitable conductivity without causing chemical changes in the battery that is to be formed. Examples of the conductive material include graphite such as natural graphite or artificial graphite; carbon blacks such as acetylene black, Denka black, Ketjen black, channel black, lamp black, and thermal black; conductive fibers such as carbon fibers and metallic fibers; conductive metal oxides such as titanium oxide; and metallic powders such as aluminum powder or nickel powder.

In the present invention, an organic electrolyte having a lithium salt dissolved in a nonaqueous organic solvent may be used as the electrolyte.

The nonaqueous organic solvent may serve as a medium allowing ions participating in the electrochemical reaction of battery to move, and examples thereof may include ethylene carbonate, propylene carbonate, dimethyl carbonate, diethyl carbonate, methylpropyl carbonate, ethylpropyl carbonate, butylene carbonate, acetonitrile, and so on, which may be used alone or in combination.

The lithium salt may serve as a lithium ion source and a lithium salt that is generally used in the art may be used as the lithium salt. Examples of the lithium salt may include at least one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$, which may be used alone or in combination.

The lithium ion secondary battery according to the present invention may further include a separator disposed between the positive and negative electrodes to prevent an electric short circuit therebetween. Examples of the separator may include a polymer film such as polyolefin, polyethylene, polypropylene, a microporous film, a woven fabric or a nonwoven fabric.

The lithium ion secondary battery according to the present invention may be manufactured by a general method that is known in the art. In addition, the lithium ion secondary battery according to the present invention may have various shapes, including a coin shape, a button shape, a sheet shape, a cylinder shape, a flat shape, and a prismatic shape, which are commonly used for the lithium ion secondary battery.

Hereinafter, examples and comparative examples of the present invention will be described. However, the following examples are merely presented to exemplify the present invention, and the scope of the present invention is not limited thereto.

EXAMPLES

Preparation Example 1

$MnSO_4$, an ammonia solution, and NaOH solution were mixed in a reaction vessel and heated at a temperature of 50° C. for 10 hours while stirring at 500 RPM to control the manganese oxide particle size to approximately 5 μm by adjusting the concentration, temperature and pH level. $Li_2CO_3$ and the prepared manganese oxide were mixed in a Li:Mn ratio of 1:2 and heated at 850° C. for 10 hours to prepare $LiMn_2O_4$ particles. Then, a pulverization process is performed to remove particles having diameters of less than 5 μm and greater than or equal to 10 μm. The particle diameters were identified by SEM photograph (see FIG. 2A)

Preparation Example 2

0.170 g of $MnSO_4H_2O$ and 0.228 g of $(NH_4)_2S_2O_8$ were dissolved in 100 ml of distilled water and sulfuric acid was added thereto to adjust a pH level to 1, followed by reacting at 130° C. for 10 hours, thereby acquiring a solid precipitate. The acquired solid precipitate was washed several times using distilled water, dried at 300° C. for 3 hours, yielding $MnO_2$ having the average diameter of 1 μm. The diameter of the prepared particle was identified by SEM photograph (see FIG. 2B). $Li_2CO_3$ and the prepared $MnO_2$ were mixed in a Li:Mn ratio of 1:2 and heated at 600° C. for 10 hours to prepare $LiMn_2O_4$ particles having diameters of 1 μm. It was confirmed that an SEM photograph image of the prepared $LiMn_2O_4$ particles was similar to that of the $MnO_2$ particles.

Preparation Example 3

0.170 g of $MnSO_4H_2O$ and 0.228 g of $(NH_4)_2S_2O_8$ were dissolved in 100 ml of distilled water and potassium hydroxide (KOH) was added thereto to adjust a pH level to 5, followed by reacting at 130° C. for 10 hours, thereby acquiring a solid precipitate. The acquired solid precipitate was washed several times using distilled water, dried at 300° C. for 3 hours, yielding $MnO_2$ having the average diameter of 200 nm. The diameter of the prepared particle was identified by SEM photograph (see FIG. 2C). $Li_2CO_3$ and the prepared $MnO_2$ were mixed in a Li:Mn ratio of 1:2 and heated at 600° C. for 10 hours to prepare $LiMn_2O_4$ particles having diameters of 200 nm. It was confirmed that an SEM photograph image of the prepared $LiMn_2O_4$ particles was similar to that of the $MnO_2$ particles.

Preparation Example 4

0.170 g of $MnSO_4H_2O$ and 0.228 g of $(NH_4)_2S_2O_8$ were dissolved in 100 ml of distilled water and potassium hydroxide (KOH) was added thereto to adjust a pH level to 10, followed by reacting at 130° C. for 10 hours, thereby acquiring a solid precipitate. The acquired solid precipitate was washed several times using distilled water, dried at 300° C. for 3 hours, yielding $MnO_2$ having the average diameter of 40 nm. The diameter of the prepared particle was identified by SEM photograph (see FIG. 2D). $Li_2CO_3$ and the prepared $MnO_2$ were mixed in a Li:Mn ratio of 1:2 and heated at 600° C. for 10 hours to prepare $LiMn_2O_4$ particles having diameters of 40 nm. It was confirmed that an SEM photograph image of the prepared $LiMn_2O_4$ particles was similar to that of the $MnO_2$ particles.

Preparation Example 5

$MnSO_4$, an ammonia solution, and NaOH solution were mixed in a reaction vessel and heated at a temperature of 50° C. for 10 hours while stirring at 500 RPM to control the manganese oxide particle size to approximately 3 μm by adjusting the concentration, temperature and pH level. $Li_2CO_3$ and the prepared manganese oxide having the average diameter of 3 μm were mixed in a Li:Mn ratio of 1:2 and heated at 850° C. for 10 hours to prepare $LiMn_2O_4$ particles having a particle size of 3 μm. Then, a pulverization process is performed to remove particles having diameters of less than 1 μm and greater than or equal to 5 μm.

Example 1

The $LiMn_2O_4$ particles having the average particle sizes of 5 μm, 1 μm and 200 nm, prepared in Preparation Example 1, 2 and 3, respectively, were mixed in a particle number ratio of 1:1:1. The resultant mixture was mixed with Denka black as a conductive agent and PVDF as a binder in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M $LiPF_6$ having EC:DMC:EC=5:3:2.

Example 2

The $LiMn_2O_4$ particles having the average particle sizes of 5 μm, 1 μm and 200 nm, prepared in Preparation Example 1, 2 and 3, respectively, were mixed in a particle number ratio of 4:1:0.25. The resultant mixture was mixed with Denka black as a conductive agent and PVDF as a binder in a molar ratio of 94:3:3 and coated on an aluminum (Al) foil to prepare a positive electrode. A coin cell was fabricated using the prepared positive electrode, a lithium metal as a negative electrode and an electrolyte solution of 1.3M $LiPF_6$ having EC:DMC:EC=5:3:2.

Example 3

The $LiMn_2O_4$ particles having the average particle sizes of 5 μm, 1 μm, 200 nm and 40 nm, prepared in Preparation Example 1, 2 and 3, respectively, were mixed in a particle number ratio of 1:1:0.5:0.5. The resultant mixture was mixed with Denka black as a conductive agent and PVDF as a binder in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M $LiPF_6$ having EC:DMC:EC=5:3:2.

Example 4

The $LiMn_2O_4$ particles having the average particle sizes of 5 μm, 1 μm and 200 nm, prepared in Preparation Example 1, 2 and 3, respectively, were mixed in a particle number ratio of 1:1.2:1.4. The resultant mixture was mixed with Denka black as a conductive agent and PVDF as a binder in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M $LiPF_6$ having EC:DMC:EC=5:3:2.

Example 5

The $LiMn_2O_4$ particles having the average particle sizes of 5 μm, 1 μm and 200 nm, prepared in Preparation Example 1, 2 and 3, respectively, were mixed in a particle number ratio of 5:1:0.2. The resultant mixture was mixed with Denka black as a conductive agent and PVDF as a binder in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M $LiPF_6$ having EC:DMC:EC=5:3:2.

Comparative Example 1

The $LiMn_2O_4$ particles having the average particle size of 5 μm prepared in Preparation Example 1, Denka Black as a conductive agent and PVDF as a binder were mixed in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M $LiPF_6$ having EC:DMC:EC=5:3:2.

Comparative Example 2

The LiMn$_2$O$_4$ particles having the average particle size of 1 μm prepared in Preparation Example 2, Denka Black as a conductive agent and PVDF as a binder were mixed in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M LiPF$_6$ having EC:DMC:EC=5:3:2.

Comparative Example 3

The LiMn$_2$O$_4$ particles having the average particle size of 200 nm prepared in Preparation Example 3, Denka Black as a conductive agent and PVDF as a binder were mixed in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M LiPF$_6$ having EC:DMC:EC=5:3:2.

Comparative Example 4

The LiMn$_2$O$_4$ particles having the average particle size of 40 nm prepared in Preparation Example 4, Denka Black as a conductive agent and PVDF as a binder were mixed in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M LiPF$_6$ having EC:DMC:EC=5:3:2.

Comparative Example 5

The LiMn$_2$O$_4$ particles having the average particle sizes of 5 μm and 1 μm, prepared in Preparation Examples 1 and 2, respectively, were mixed in a particle number ratio of 1:1. The resultant mixture was mixed with Denka black as a conductive agent and PVDF as a binder in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M LiPF$_6$ having EC:DMC:EC=5:3:2.

Comparative Example 6

The LiMn$_2$O$_4$ particles having the average particle sizes of 3 μm, 1 μm and 200 nm, prepared in Preparation Examples 5, 2 and 3, respectively, were mixed in a particle number ratio of 1:1:1. The resultant mixture was mixed with Denka black as a conductive agent and PVDF as a binder in a molar ratio of 94:3:3 and then coated on an aluminum (Al) foil to prepare a positive electrode. A coin cell was fabricated using the prepared positive electrode, a lithium metal as a negative electrode and an electrolyte solution of 1.3M LiPF$_6$ having EC:DMC:EC=5:3:2.

The battery capacity and electrode density of each of coin cells manufactured in Examples and Comparative Example were measured.

1. Measurement of Electrode Density

LiMn$_2$O$_4$ as a positive active material, Denka black as a conductive agent, and a PVDF as a binder were mixed in a molar ratio of 94:3:3 to prepare a slurry using NMP solvent to be coated on an aluminum (Al) foil. The electrode was dried in an oven maintained at 120° C. for 2 hours and in a vacuum oven maintained at 120° C. for 2 hours, following by pressing using a pressing device. Here, the weight and thickness of the electrode were obtained by subtracting the weight and thickness of Al from the measured weight and thickness of the resultant product, thereby obtaining the density of electrode including the positive active material, the conductive agent and the binder mixed therein.

2. Measurement of Battery Capacity

A coin cell was fabricated using the prepared positive electrode, a lithium metal as a negative electrode and an electrolyte solution of 1.3M LiPF$_6$ having EC:DMC:EC=5:3:2. The fabricated coin cell was charged and discharged at a 0.1 C-rate, thereby obtaining a discharge capacity. The battery capacity per volume was obtained by dividing the discharge capacity by the electrode density.

TABLE 1

|  | Electrode Density (g/cc) | Battery Capacity (mAh/cc) |
| --- | --- | --- |
| Example 1 | 2.3 | 273 |
| Example 2 | 2.3 | 269 |
| Example 3 | 2.3 | 272 |
| Example 4 | 2.0 | 258 |
| Example 5 | 2.1 | 262 |
| Comparative Example 1 | 2.1 | 260 |
| Comparative Example 2 | 1.29 | 139 |
| Comparative Example 3 | 1.08 | 114 |
| Comparative Example 4 | 0.74 | 85 |
| Comparative Example 5 | 2.2 | 265 |
| Comparative Example 6 | 1.9 | 257 |

As shown in Table 1, the coin cell including the positive active material prepared by mixing three types of lithium manganese oxide particles having different sizes demonstrated excellent battery capacity and electrode density Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A lithium manganese oxide positive active material for a lithium ion secondary battery, the positive active material comprising:
    a spinel lithium manganese oxide of three or more types of particles having different sizes mixed therein, wherein
    first spinel lithium manganese oxide particles have an average diameter of 5 μm or greater, second spinel lithium manganese oxide particles have an average diameter of 1 μm or less, third spinel lithium manganese oxide particles have an average diameter of 200 nm or less, the average diameter of the second spinel lithium manganese oxide particles is greater than that of the third spinel lithium manganese oxide particles,
    a ratio of the number of second spinel lithium manganese oxide particles to the number of third spinel lithium manganese oxide particles is in a range between 1 and 4,
    the first spinel lithium manganese oxide particles are shaped of spheres, and
    the third spinel lithium manganese oxide particles are shaped of rods.

2. The lithium manganese oxide positive active material of claim 1, wherein a ratio of the number of first spinel lithium manganese oxide particles to the number of second spinel lithium manganese oxide particles and a ratio of the number of second spinel lithium manganese oxide particles to the number of third spinel lithium manganese oxide particles are in a range between 1 and 4.

3. The lithium manganese oxide positive active material of claim 1, further comprising fourth spinel lithium manganese oxide particles having an average diameter of 40 nm or less, wherein the average diameter of the third spinel lithium manganese oxide particles is greater than that of the fourth spinel lithium manganese oxide particles.

4. The lithium manganese oxide positive active material of claim 3, wherein the fourth spinel lithium manganese oxide particles are shaped of nanowires.

5. The lithium manganese oxide positive active material of claim 1, wherein the spinel lithium manganese oxide includes at least one selected from the group consisting of $LiMn_2O_4$, $LiM_xMn_{2-x}O_4$, where M is at least one selected from the group consisting of Ni, Zr, Co, Mg, Mo, Al and Ag, and $0<x<1$, and $LiM_xMn_{2-x}O_{4-z}F_z$, where M is at least one selected from the group consisting of Ni, Zr, Co, Mg, Mo, Al and Ag, $0<x<1$, and $0<z<1$.

6. A lithium ion secondary battery comprising a positive electrode including the positive active material of claim 1, a negative electrode and an electrolyte.

7. A lithium ion secondary battery comprising a positive electrode including the positive active material of claim 2, a negative electrode and an electrolyte.

8. A lithium ion secondary battery comprising a positive electrode including the positive active material of claim 3, a negative electrode and an electrolyte.

9. A lithium ion secondary battery comprising a positive electrode including the positive active material of claim 4, a negative electrode and an electrolyte.

10. A lithium ion secondary battery comprising a positive electrode including the positive active material of claim 5, a negative electrode and an electrolyte.

* * * * *